United States Patent

Kraus et al.

[11] 3,722,647
[45] Mar. 27, 1973

[54] WET-TYPE FRICTION CLUTCH

[75] Inventors: Helmut Kraus, Schweinfurt; Hans-Walter Riese, Dittelbrunn, both of Germany

[73] Assignee: Fichtel Sachs AG, Schweinfurt, Germany

[22] Filed: Dec. 22, 1970

[21] Appl. No.: 100,711

[30] Foreign Application Priority Data

Jan. 7, 1970  Germany..................P 20 00 379.6

[52] U.S. Cl..........................192/113 B, 192/103 F
[51] Int. Cl..............................................F16d 13/74
[58] Field of Search..............192/113 B, 91 A, 103 F

[56] References Cited

UNITED STATES PATENTS

| 3,104,746 | 9/1963 | Gadd et al. | 192/113 B |
| 3,314,513 | 4/1967 | Lake et al. | 192/113 B |
| 3,334,717 | 8/1967 | Spokas et al. | 192/113 B |

*Primary Examiner*—Charles J. Myhre
*Assistant Examiner*—Randall Heald
*Attorney*—Kelman & Berman

[57] ABSTRACT

The friction facings in an automotive friction clutch of the wet type are supplied with liquid lubricant by a gear pump mounted on the clutch release bearing in such a manner that the stator of the pump is secured against rotation by the clutch release fork while the pump rotor is connected with the release levers on the clutch casing for joint rotation whenever the associated engine is operated.

8 Claims, 4 Drawing Figures

WET-TYPE FRICTION CLUTCH

This invention relates to friction clutches, particularly of the wet type, and is more specifically concerned with a pump arrangement for keeping the friction elements on the input member and the output shaft of the clutch supplied with lubricant.

It has been proposed heretofore to associate a rotary lubricant pump with the clutch release device in such a manner that the rotor is driven by a normally rotating element of the clutch. The known device, however, requires a complex and costly mechanism for transmitting motion from the clutch to the pump rotor.

The primary object of this invention is the provision of a wet-type clutch of the type described with a lubricant supplying pump whose rotor is drivingly connected with a normally rotating clutch element in a very simple manner.

At the core of this invention is the finding that the actual clutch release members, such as the clutch release levers or the central fingers or sectors of a diaphragm spring, conveniently lend themselves to a driving connection with the pump rotor.

In its more specific aspects, the invention resides in an improvement in known friction clutches of the type having an input member, such as an engine flywheel and an attached clutch casing, and an output shaft which are arranged for rotation about a common axis. Friction elements on the input member and the shaft are biased by a yieldably resilient pressure device, such as a spring-backed pressure plate, toward torque-transmitting engagement for thereby coupling the shaft to the input member. A releasing mechanism for deactivating the pressure device and for thereby permitting disengagement of the friction elements includes a disengaging member, such as a clutch release lever or a diaphragm spring sector which is connected to the input member for rotation therewith.

The disengaging member is moved relative to the input member by an operating mechanism, such as a clutch release bearing assembly, which has a first portion rotatable about the clutch axis and includes an abutment engageable with the disengaging member for operating the same and for thereby disengaging the friction elements. A second portion of the operating mechanism is secured against rotation about the clutch axis. The two portions are connected by a bearing for rotation about the axis, and a shifting device, such as a clutch release fork, is provided for jointly moving the two portions in the direction of the clutch axis and for thereby abuttingly engaging the aforementioned abutment with the disengaging member. This much is known.

This invention is concerned with a pump arrangement for supplying liquid lubricant to the friction elements. For this purpose, there is provided a rotary pump having a stator portion and a rotor portion which jointly define a pump chamber. An intake conduit and a discharge conduit communicate with the chamber for respectively receiving and discharging the lubricant when the rotor portion is rotated relative to the stator portion. A motion transmitting train connects the rotor portion to the disengaging member mentioned above for joint rotation therewith.

Other features, additional objects, and many of the attendant advantages of this invention will be appreciated readily as the same becomes better understood by reference to the following detailed description of preferred embodiments when considered in connection with the appended drawing in which.

Figure 1:
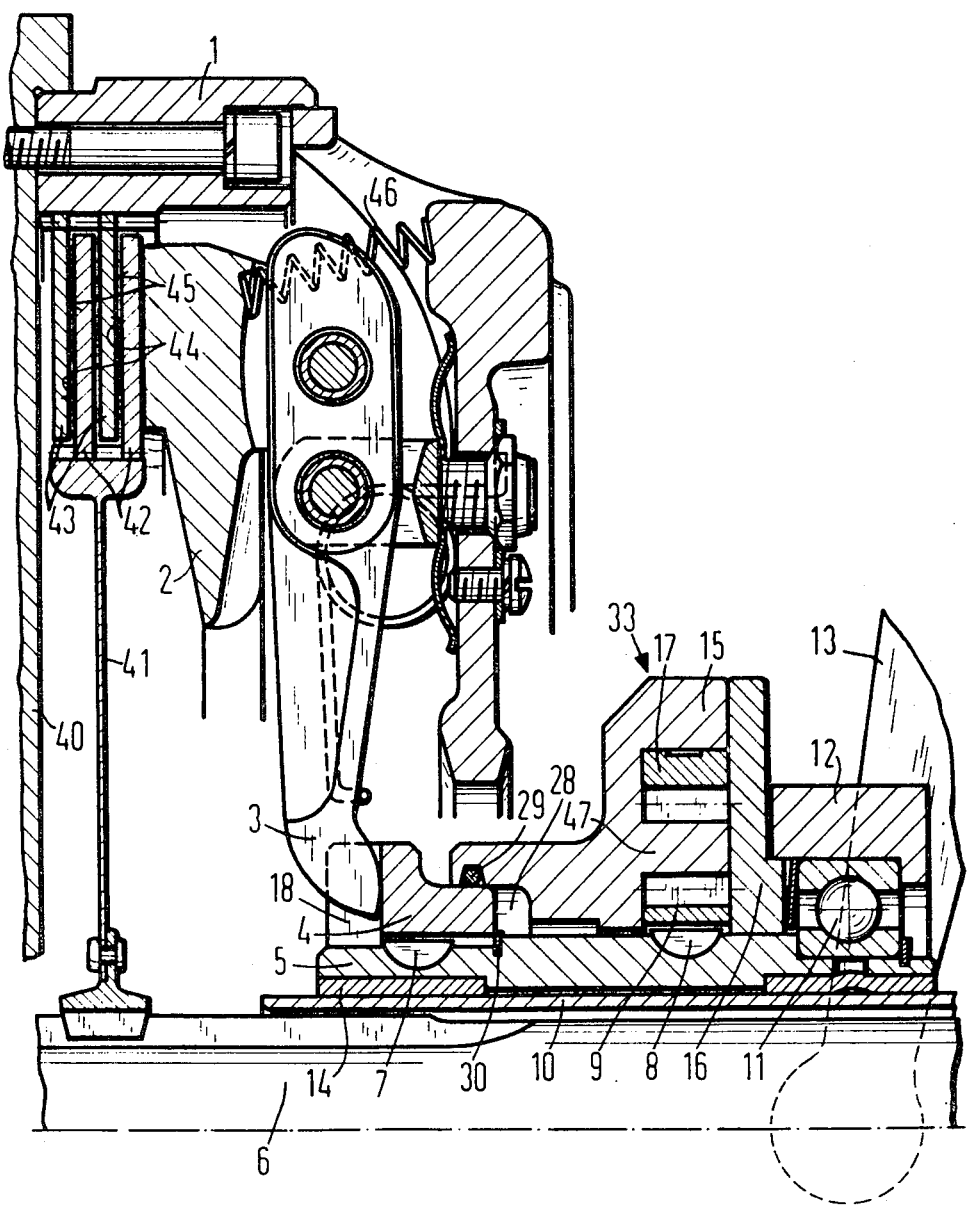
FIG. 1 shows a wet-type clutch arrangement of the invention in fragmentary axial section.

Referring now to the drawing in detail, and initially to FIG. 1, there is seen the casing 1 of a friction clutch which is normally rotated about its axis by the partially illustrated flywheel 40 of an internal combustion engine, not otherwise shown, so that the flywheel 40 constitutes the input member of the clutch. The output member of the clutch is a shaft 6 coaxial with the casing 1. A disc 41 splined to the shaft 6 for joint rotation while capable of axial movement carries flat, peripheral rings 42, and similar rings 43 secured against rotation on an inner wall of the casing 1 are interleaved with the rings 42. The rings 42, 43 are axially movable on the supporting elements 41, 1 for engagement of respective friction facings 44, 45. The friction facings are normally held in torque transmitting engagement by a pressure plate 2 which is axially biased toward the stack of rings 42, 43 by circumferentially distributed helical compression springs 46. Clutch release levers 3 which are radially elongated relative to the clutch axis, are angularly distributed about the axis and pivot about respective axes tangential to a common circle about the clutch axis. When the single lever 3 seen in FIG. 1 is pivoted clockwise, it lifts the pressure plate 2 from the rings 42, 43 to disengage the clutch. The structure described so far is fully known.

The radially inner end of each lever 3 engages a radially and axially open, circumferentially closed notch 18 in an abutment ring 4 secured on one axial end of a sleeve 5 by a key 7 which prevents relative rotation of the ring 4 and the sleeve 5, and by a retaining ring 30 which axially secures the ring 4 against movement on the sleeve 5 under the pressure of the lever 3. The sleeve 5 therefore rotates with the casing 1. The sleeve 5 is mounted on a stationary tube 10 coaxial with the shaft 6 by means of two axially spaced bearing bushings 14. The shaft 6 is the input shaft of a gear transmission, as is conventional and not further shown, and the tube 10 is fixed on the transmission housing. A sealing ring, not seen in the drawing, closes the annular gap between the tube 10 and the shaft 6 at the entrance to the transmission housing.

The other axial end of the sleeve 5 carries the inner race of a ball bearing 11. The outer race is mounted in an annular housing 12 which may rotate on the bearing 11 and is secured by the bearing against axial displacement. A clutch release fork 13 is pivotally secured to the bearing housing 12 in a conventional manner and connected to a non-illustrated clutch pedal for shifting the housing 12, the sleeve 5, and the abutment ring 4 toward the left, as viewed in FIG. 1, when the pedal is depressed, and thereby to pivot the levers 3 and to disengage the clutch.

Figure 2:
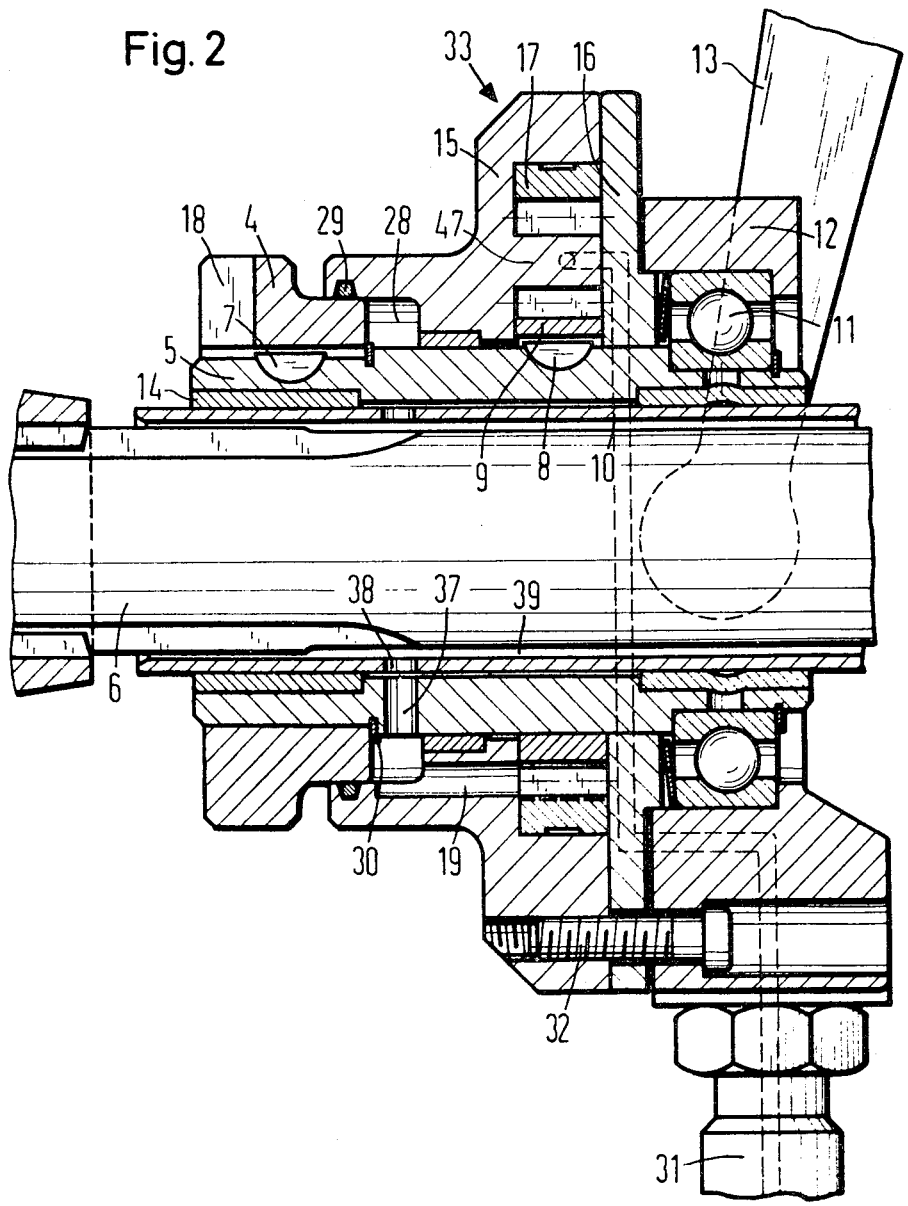
FIG. 2 illustrates the release bearing and associated elements of the clutch arrangement of FIG. 1 in axial section.

A rotary gear pump 33 is mounted on the sleeve 5 between the bearing housing 12 and the abutment ring 4. As is better seen in FIG. 2, the tubular pump housing 15, a radial cover plate 16 for the housing 15, and the bearing housing 12 are fixedly fastened to each other by screws 32 of which only one is seen in FIG. 2. The pump housing is formed with a chamber whose outer wall is cylindrical about an axis parallel to, but radially offset from the clutch axis and receives an internally toothed gear ring 17 in sliding engagement with the outer wall. In the assembled condition of the apparatus, the inner wall of the pump chamber is formed by an externally toothed gear ring 9 having a much smaller pitch diameter than the gear ring 17 and secured to the sleeve 5 by a key 8. The gear ring 9 meshingly engages the gear ring 17 at the radially narrowest portion of the pump chamber only. The widest portion of the generally crescent-shaped pump chamber is divided by a partition 47 integral with the housing 15. The partition leaves but a minimal clearance for the teeth of the gear rings 9, 17.

Gear pumps of the type described above are known in themselves, and a more detailed pictorial representation is not necessary. The partition 47 divides the pump chamber into a suction compartment and a compression compartment. The suction compartment is connected with an oil sump of the clutch through a flexible intake hose 31 and communicating bores in the bearing housing 12 and the cover plate 16 which is arranged axially between the housings 12 and 15. The pumped oil is discharged under pressure from the narrowest part of the annular pump chamber into an axial bore 19 of the pump housing 15 and an axially open circumferential groove 28 in the inner face of the housing 15. The groove 28 is sealed in an axially outward direction by the abutment ring 4 and a sealing ring 29 interposed between the abutment ring 4 and the pump housing 15 to permit relative rotation.

A radial bore 37 in the sleeve 5 is radially aligned with the groove 28 in all operative positions of the apparatus and leads into an annular space between the sleeve 5 and the tube 10 which is sealed in opposite axial directions by the bearing bushings 14. In the engaged clutch condition, the bore 37 extends in a common radial plane with a radial bore 38 in the tube 10 which leads into the annular gap 39 between the tube 10 and the shaft 6. As mentioned above, the gap 39 is sealed at its non-illustrated end at the transmission housing, and the oil discharged by the pump 33 is projected axially from the annular orifice at the illustrated free end of the tube 10. Centrifugal forces act on the discharged oil and direct it toward the friction facings 44, 45. The excess oil is drained to the afore-mentioned sump in a known manner, not shown.

Under all operating conditions, the tube 10, the fork 13, the housings 12, 15, and the cover plate 16 are prevented from rotating about the clutch axis by non-illustrated elements which fasten the fork 13 to the vehicle frame. As long as the flywheel 40 is turned by the non-illustrated engine, the levers 3 rotate with the clutch casing 3 and the flywheel 40, and their rotary motion is transmitted by the abutment ring 4 and the sleeve 5 to the inner gear ring 9 of the pump 33. The rings 9, 17 mesh, and the outer gear ring 17 rotates in the stationary pump housing 15 about its axis which is offset from the clutch axis. Oil is therefore pumped to the friction facings 44, 45 at all times during operation of the engine.

When the non-illustrated clutch pedal is depressed, the sleeve 5 and all elements mounted thereon, as shown in FIG. 2, are shifted toward the left, the levers 3 are pivoted by the abutment ring 4, and the clutch is disengaged. The shaft 6 may then stop, but the pump 33 keeps operating, and the friction facings 44, 45 are wet with oil when the pedal is released, and the sleeve 5 is shifted toward the right by the clutch springs 46 (FIG. 1).

Figure 3:
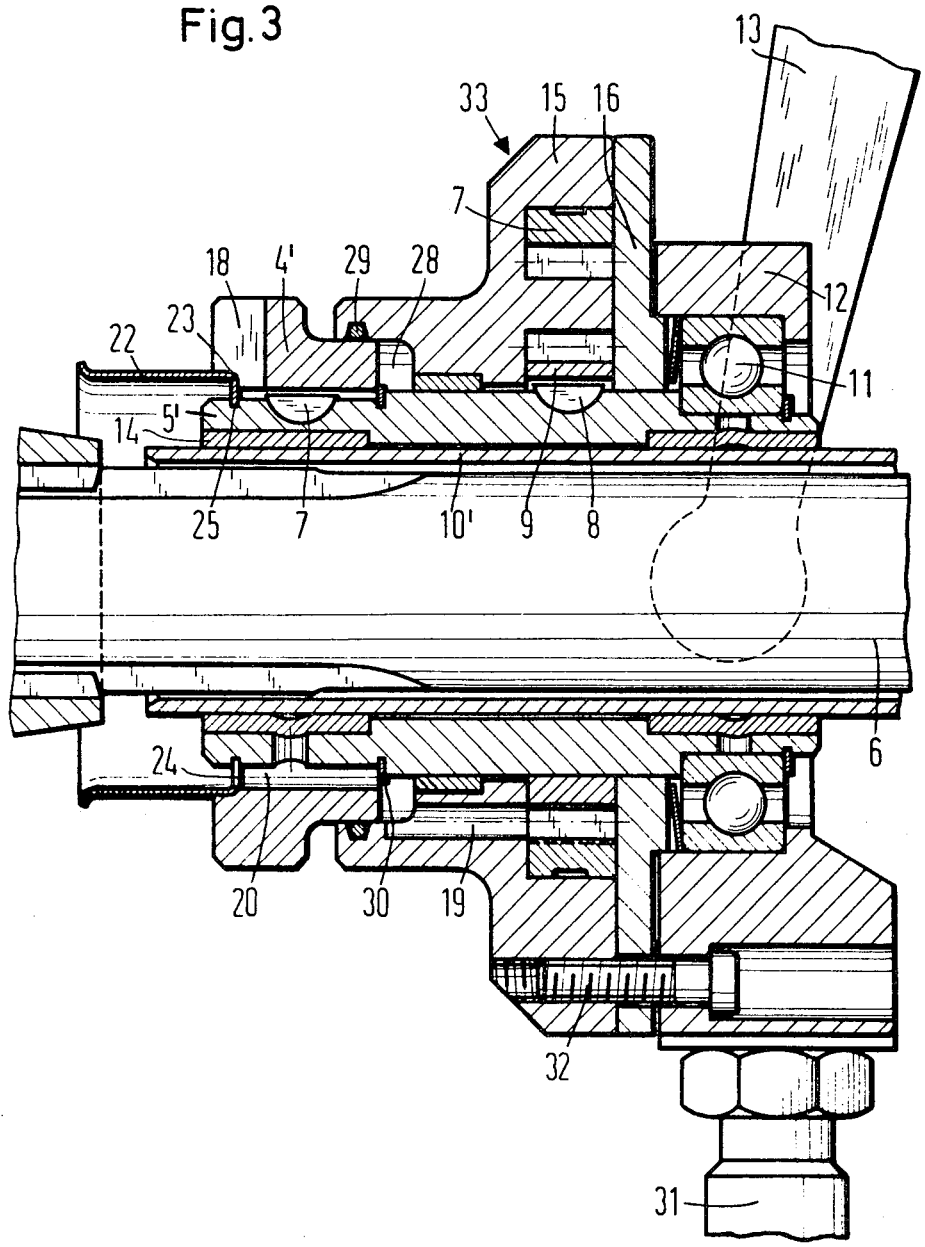
FIGS. 3 and 4 show modifications of the apparatus of FIG. 1 in views corresponding to FIG. 2.

The clutch arrangement partly illustrated in FIG. 3 differs from that described above with reference to FIGS. 1 and 2 by the manner in which the oil discharged from the pump 33 is directed to the friction facings 44, 45, not themselves seen in FIG. 3. The apparatus of FIG. 3 is identical with that shown in FIGS. 1 and 2 as far as not specifically described hereinbelow. The common features are provided with the same reference numerals as in FIGS. 1 and 2 and will not be described again.

The abutment ring 4' differs from the corresponding ring 4 by being provided with axial grooves 20 communicating with the annular groove 28 of the pump housing 15 and open axially toward the clutch disc 41. The radial width of the retaining ring 30, which partly projects into the groove 20, is too small to interfere with oil flow. The outer orifice of the groove 20 is located within a sheet metal tube 22 which is generally cylindrical about the clutch axis. An inner radial flange 23 at one end of the tube 22 resiliently engages a circumferential groove 25 in the sleeve 5' and has apertures 24 which permit oil from the groove 20 to enter the interior of the tube 22 closely adjacent its inner wall.

The tube 22 rotates with the abutment ring 4', and thus at all times when the associated engine operates. The oil discharged axially from the grooves 20 is directed close to the disc 41 by the tube 22 and centrifugally propelled toward the friction facings 44, 45. The sleeve 5' and the tube 10' differ from the corresponding elements in FIG. 2 by lacking the bores 37, 38, and the sleeve 5' seals the groove 20 in a radially inward direction. The flange 23 which simultaneously engages the sleeve 5' and the ring 4' axially secures the latter even when not engaged by the lever 3.

The release bearing and oil pump arrangement of the invention is not limited in its application to friction clutches whose facings are disengaged by levers, but is equally suited for clutches equipped with a diaphragm spring, a slightly dished circle of spring-temper metal having a central passage for the clutch shaft and associated elements, and slots radiating from the central passage and dividing the central portion of the spring into radial sectors or fingers.

Figure 4:
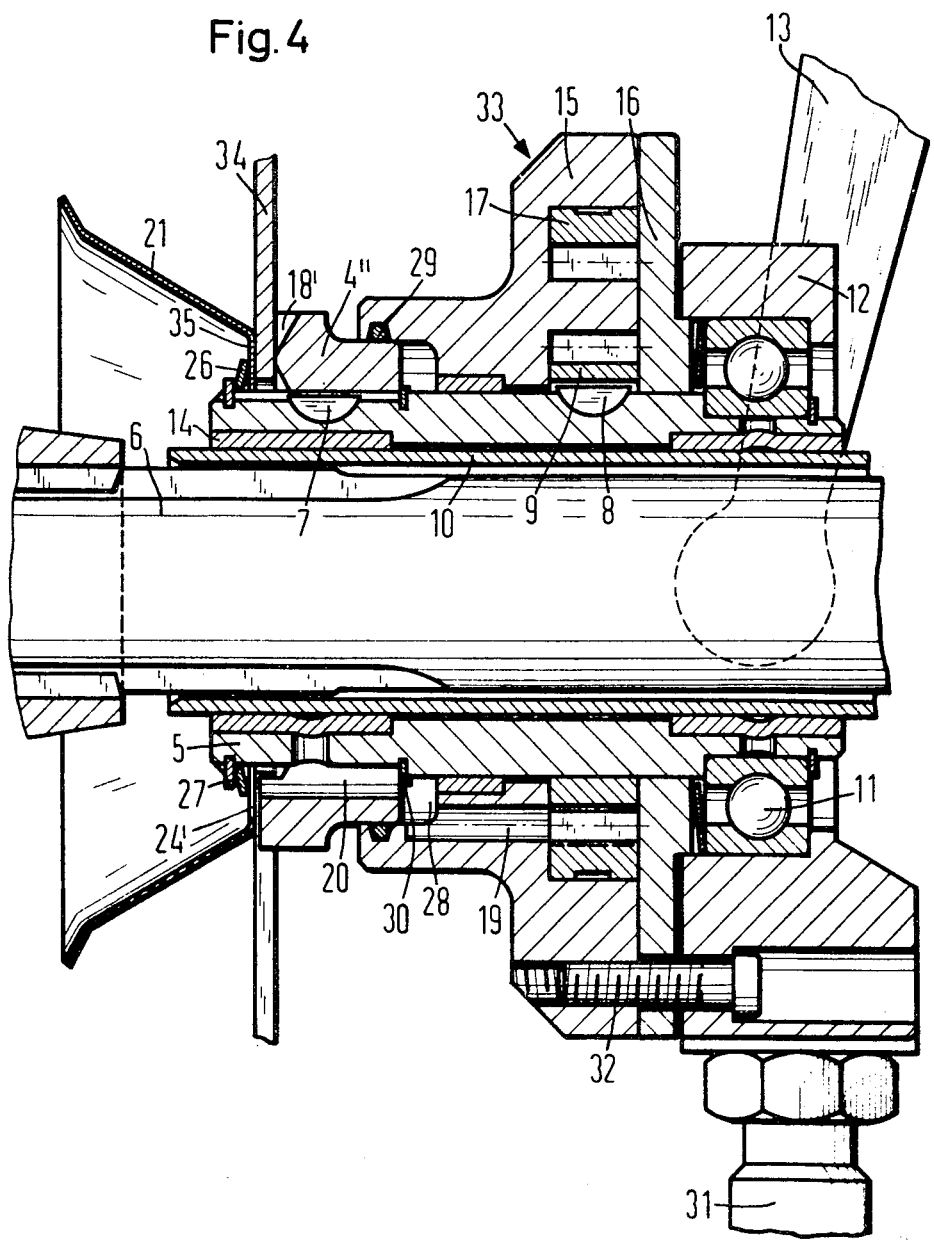

FIG. 4 shows an embodiment of the invention in a clutch having a diaphragm spring, conventional in itself, of which only fingers 34 are seen. The fingers are contained circumferentially in correspondingly shaped and dimensioned recesses 18' in an abutment ring 4'' otherwise substantially identical with the afore-described ring 4', and are axially retained in the recesses 18' by a cup spring 26 backed by a retaining ring 27 on the sleeve 5'.

A frustoconical sheet metal member 21 coaxial with the shaft 6 has an inner radial flange 35 at its smaller base. The flange 35 is clamped between the cup spring 26 and the fingers 34 of the diaphragm spring, not otherwise shown. Apertures 24' in the flange 35 and the slots between the fingers 34 permit oil to be discharged axially from the grooves 20 in the abutment ring 4'', and the discharged oil is released from the larger base of the member 21 which is radially aligned with the stack of friction rings 42, 43, not themselves visible in FIG. 4.

The diaphragm spring is fastened to the clutch cover, as is conventional and not explicitly shown. It therefore forms a portion of a motion transmitting train which connects the rotor of the pump 33 constituted by the ring gear 9 to the input member 40 of the clutch.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A friction clutch arrangement comprising, in combination:
    a. an input member;
    b. an output shaft, said member and said shaft being mounted for rotation about a common axis;
    c. friction elements mounted on said member and on said shaft respectively;
    d. yieldably resilient pressure means axially biassing said elements toward torque transmitting engagement for thereby coupling said shaft to said member;
    e. a radially extending clutch disengaging member having a radially central portion pivotally secured to said input member for rotation therewith of said clutch disengaging member and for axial movement of a radially inner terminal portion thereof relative to said input member, and a radially outer terminal portion;
    f. means operatively connecting said radially outer terminal portion of the disengaging member to said pressure means for deactivating said pressure means and for thereby permitting disengagement of said elements in response to said axial movement;
    g. a stationary tubular support coaxially enveloping said shaft;
    h. a sleeve member axially slidable and rotatable on said support about said axis;
    i. an abutment member fixedly fastened to said sleeve member and formed with a circumferentially closed recess, said recess being open radially outward and axially toward said friction elements, the radially inner terminal portion of the clutch disengaging member being received in said recess for joint rotation and joint axial movement therewith;
    j. a pump housing extending about said sleeve member;
    k. bearing means interposed between said pump housing and said sleeve member for axially securing said housing and said sleeve member to each other while permitting relative rotation about said axis;
    l. an externally toothed first gear fixedly and coaxially fastened to said sleeve member and enclosed in said pump housing;
    m. an internally toothed second gear having a pitch diameter substantially greater than the pitch diameter of said first gear, said second gear meshingly engaging said first gear in said pump housing;
    n. partition means interposed between said gears in said pump housing and defining a suction compartment and a compression compartment;
    o. conduit means for connecting said suction compartment to a source of liquid lubricant;
    p. nozzle means communicating with said compression compartment for discharging said lubricant toward said friction elements; and
    q. operating means for axially moving said pump housing while preventing rotation thereof about said axis.

2. An arrangement as set forth in claim 1, said abutment member being mounted on one axial end of said sleeve member, said bearing means including a bearing on the other axial end of said sleeve member, said pump housing and said gears being axially interposed between said abutment member and said bearing.

3. An arrangement as set forth in claim 2, said disengaging member being a lever mounted on said input member for pivoting movement about an axis tangential relative to a circle about said common axis.

4. An arrangement as set forth in claim 2, said abutment member being formed with a bore communicating with said pump chamber and constituting a portion of said nozzle means, said abutment member being spaced axially from said elements, said nozzle means further comprising a tubular member axially extending from said abutment member toward said elements, said tubular member communicating with said bore and being axially open toward said elements.

5. An arrangement as set forth in claim 4, said sleeve member being formed with a circumferential groove, said tubular member having a radially inward directed flange engaging said groove and thereby securing said tubular member to said sleeve member, said flange axially abutting against said abutment member and thereby axially securing the same on said sleeve member.

6. An arrangement as set forth in claim 4, said tubular member flaring substantially conically in an axial direction from said abutment member toward said elements.

7. An arrangement as set forth in claim 2, wherein said sleeve member, said abutment member, and said pump housing jointly define an annular conduit about said axis, said pump housing being formed with an axial duct connecting said compression compartment with said annular conduit, and said jet means communicating with said conduit.

8. An arrangement as set forth in claim 2, wherein said support and said shaft radially bound an annular gap axially open toward said elements and constituting said jet means, said support and said sleeve member radially bound an annular space sealed in both axial directions, and said sleeve member and said support are formed with respective radial bores connecting said annular space to said annular conduit and said annular gap.

* * * * *